United States Patent
Levine et al.

(10) Patent No.: US 6,606,762 B1
(45) Date of Patent: Aug. 19, 2003

(54) HINGE FOR A ROTATABLY CONNECTED COVER

(75) Inventors: Lawrence T. Levine, Easton, CT (US); Harvey Levine, Fairfield, CT (US)

(73) Assignee: Myron Corp., Maywood, NJ (US)

( * ) Notice: Subject to any disclaimer, the term of this patent is extended or adjusted under 35 U.S.C. 154(b) by 0 days.

(21) Appl. No.: 10/090,088

(22) Filed: Mar. 4, 2002

(51) Int. Cl.$^7$ ................................................ E05F 1/08
(52) U.S. Cl. ........................ 16/286; 361/683; 361/680; 361/681
(58) Field of Search ...................... 16/286, 197, 281, 16/177, 63, 58; 361/683, 680, 681; 49/386, 199, 200; 248/455, 457; 235/1 D, 145 R; 312/327, 328, 319.2, 319.4

(56) References Cited

U.S. PATENT DOCUMENTS

| | | | | |
|---|---|---|---|---|
| 2,099,191 A | * | 11/1937 | Blodgett | 160/189 |
| 2,166,746 A | * | 7/1939 | Bartel | 160/191 |
| 3,952,365 A | * | 4/1976 | Grisebach | 16/52 |
| 4,248,016 A | * | 2/1981 | Pecchioni | 49/200 |
| 4,259,568 A | * | 3/1981 | Dynesen | 235/1 D |
| 4,290,168 A | * | 9/1981 | Binge | 16/271 |
| 4,574,423 A | | 3/1986 | Ito et al. | |
| 4,683,677 A | * | 8/1987 | Jurgensen | 49/200 |
| 4,703,160 A | * | 10/1987 | Narishima et al. | 235/1 D |
| 4,964,683 A | * | 10/1990 | Sugarek et al. | 312/207 |
| 5,067,938 A | * | 11/1991 | Uchida et al. | 494/12 |
| 5,100,098 A | | 3/1992 | Hawkins | |
| 5,128,829 A | | 7/1992 | Loew | |
| 5,142,738 A | | 9/1992 | Ojima | |
| 5,436,954 A | * | 7/1995 | Nishiyama et al. | 455/566 |
| 5,568,358 A | * | 10/1996 | Nelson et al. | 361/681 |
| 5,593,203 A | * | 1/1997 | Abbott | 296/178 |
| 5,607,054 A | * | 3/1997 | Hollingsworth | 206/320 |
| 5,615,723 A | * | 4/1997 | Carper | 160/191 |
| 5,704,094 A | | 1/1998 | Hartigan et al. | |
| 5,732,135 A | * | 3/1998 | Weadon et al. | 379/433.13 |
| 5,737,183 A | | 4/1998 | Kobayashi et al. | |
| 5,799,079 A | * | 8/1998 | Inoue | 379/433.13 |
| 5,803,149 A | * | 9/1998 | Halley et al. | 160/201 |
| 5,881,150 A | * | 3/1999 | Persson | 379/433.13 |
| 5,930,865 A | * | 8/1999 | Mihalcheon | 16/197 |
| 5,960,849 A | * | 10/1999 | Delaney et al. | 160/188 |
| 5,980,006 A | * | 11/1999 | Wilhelmstatter et al. | 312/319.1 |
| 5,987,122 A | * | 11/1999 | Daffara et al. | 379/433.13 |
| 5,988,933 A | * | 11/1999 | Wilhelmstatter et al. | 403/381 |
| 6,034,866 A | | 3/2000 | Nobuchi et al. | |
| D426,849 S | * | 6/2000 | Lee | D18/7 |
| 6,085,384 A | * | 7/2000 | Bivens | 16/54 |
| 6,178,085 B1 | * | 1/2001 | Leung | 361/683 |
| 6,249,431 B1 | | 6/2001 | Chan | |
| 6,442,897 B1 | * | 9/2002 | Mullet | 49/199 |
| 6,505,381 B1 | * | 1/2003 | Thomson et al. | 16/302 |

* cited by examiner

Primary Examiner—Robert J. Sandy
Assistant Examiner—Matthew E. Rodgers
(74) Attorney, Agent, or Firm—Colucci & Umans; Peter C. Michalos; Angelo Notaro (57) ABSTRACT

A hinge rotates a cover pivotably connected to a device housing from a closed position to an open position. A shaft is connected to the cover. The shaft and cover have a common axis of rotation. A spring having a top end and a bottom end is affixed at its bottom end to the device housing. A line has a first end connected to the top end of the spring and a second end wound onto the shaft. When the cover is in the closed position, the spring is in an extended state. Upon release of the cover from the closed position, the spring force returns the spring toward a neutral state, thereby unwinding the line from the shaft and causing rotation of the cover to the open position.

27 Claims, 7 Drawing Sheets

HINGE FOR A ROTATABLY CONNECTED COVER

FIELD OF THE INVENTION

The present invention relates generally to a hinge preferably used in opening and closing various opening and closing members of devices such as a calculator, a clock, a portable telephone, a portable computer, an electronic notebook, or the like, relative to a main body of the device, and in particular, to a hinge which rotates opening and closing members from a closed position on the device to an open position, preferably for supporting the device on a horizontal surface.

BACKGROUND OF THE INVENTION

There have been publicly known various structures of hinges in which various cams and springs are integrated to maintain a cover or lid at an arbitrary or a predetermined opening angle relative to a main body of a device. However, many of these known structures are excessively complicated and have high fabrication costs.

U.S. Pat. No. 5,436,954 to Nishiyama discloses a portable telephone having a rotatable display panel hingedly connected to a key pad casing. A tension coil spring is housed in the casing and connected to the casing and the display panel at each of its respective ends. The spring asserts a rotational force on the display panel causing the display panel to automatically rotate to its open position.

U.S. Pat. No. 5,568,358 to Nelson et al. is directed to a portable signal processing communications device having a hingedly connected lid which covers a display screen when in a closed position and is manually rotated rearwardly, by hand, to form a support for maintaining the device in a tilted position on a horizontal surface.

U.S. Pat. No. 4,703,160 to Narishima, et al. discloses a casing structure for a portable electronic device having hingedly connected covering portions which are folded backward to form a stand for maintaining the device in an inclined position on a horizontal surface.

U.S. Pat. No. 6,178,085 to Leung discloses a calculator having a pre-stressed torsional spring and damping drum assembly that pivots a lid from a closed position over a display screen to a standing position. The pre-stressed torsional spring and damping drum assembly is housed in a bore in the lid.

A portable calculator having hinged cover attached to an end of the calculator casing is disclosed in U.S. Pat. No. 4,259,568 to Dynesen. The cover is formed by a first part and a second longer part connected by a hinged joint. The second longer part projects below the bottom of the calculator and the first part extends at an angle when the cover forms a stand. When not in use, the hinged covers may be folded forwardly and laid flat over the surface of the calculator to form a protective flat cover extending over the entire front surface of the calculator.

A portable telephone having a hinge assembly that urges a cover from a closed position to an open position upon releasing a latch is disclosed in U.S. Pat. No. 5,987,122 to Daffara et al.

U.S. Pat. No. 5,607,054 to Hollingsworth discloses a carrying case for a notebook computer having front and back panels which cover the computer. The front panel is adapted to be folded rearwardly to form a stand that supports the notebook computer in an inclined position.

While the above described prior art discloses different types of hinges for electronic and mechanical apparatuses, a need remains for a simple and economical structure for a hinge that rotates a pivotably connected cover from a closed position to an open position, which avoids the complexity and expense of the prior art.

SUMMARY OF THE INVENTION

The invention provides a hinge for a rotatably connected cover which is mechanically simple in design and inexpensive to manufacture and maintain.

In accordance with the invention, a hinge is provided for rotating a cover pivotably connected to a device housing from a closed position to an open position. A shaft is connected to the cover. The shaft and cover have a common axis of rotation. A spring adjacent one side of the housing has a top end and a bottom end which is affixed at its bottom end to the device housing. A line has a first end connected to the top end of the spring and a second end wound onto the shaft. When the cover is in the closed position, the spring is in an extended state. Upon release of the cover from the closed position, the spring force returns the spring toward a neutral state, thereby unwinding the line from the shaft and causing rearward rotation of the cover to the open position.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

It should be understood that the instant invention can be used in many different electronic and mechanical devices having rotatably connected covers, including, but not limited to, a calculator, a clock, an alarm, a telephone, a mirror and a flashlight combination device, a document holder, and a note and/or memo holder.

Figure 1:
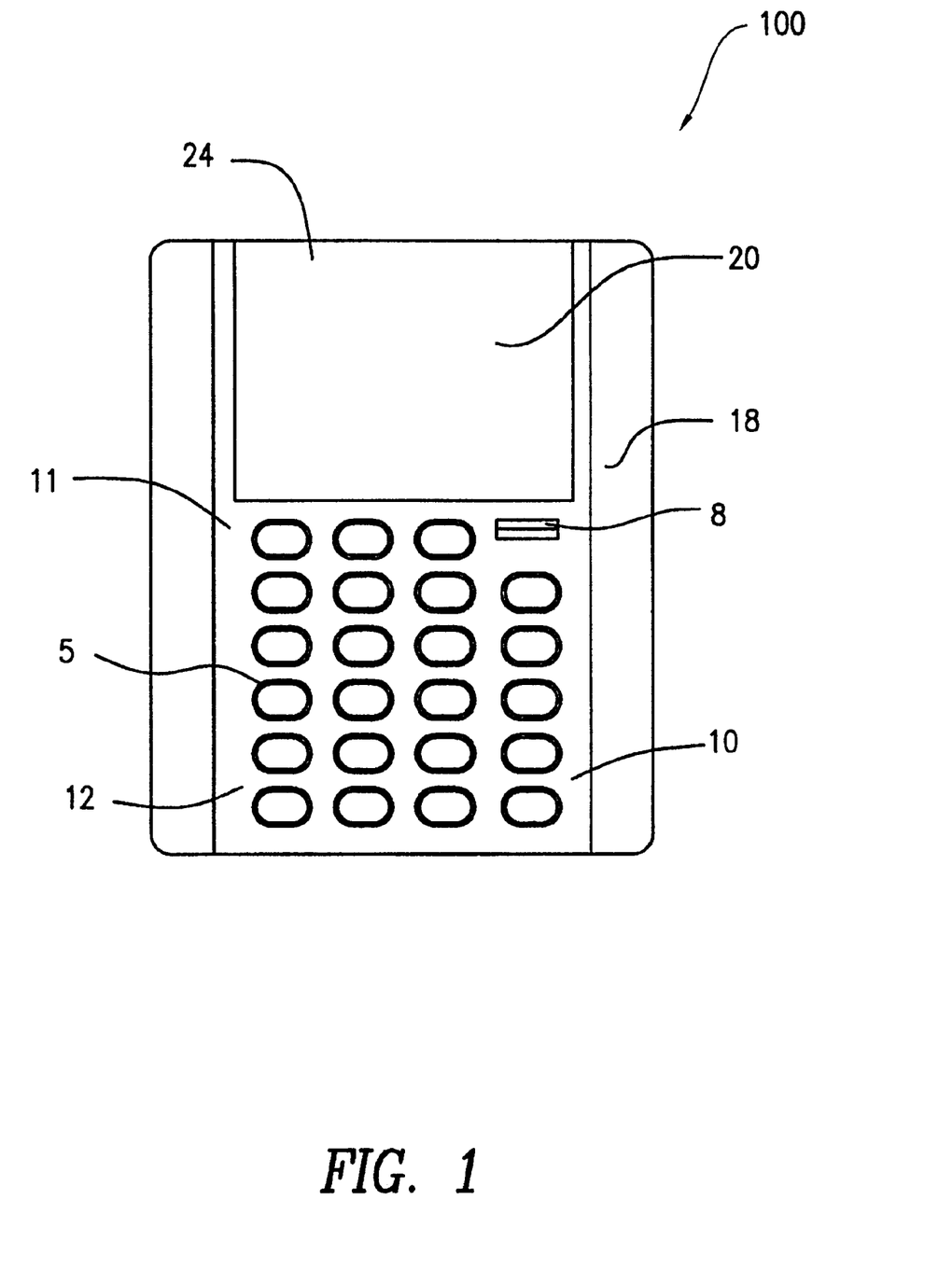
FIG. 1 is a is a front elevational view of the device of the present invention.

Referring now to the drawings, in which like reference numerals are used to refer to the same or similar elements, FIG. 1 shows a device 100 having a housing 10 with a front panel 11. The housing is shown having a keypad 12 and a display screen 13 (shown in FIG. 2) but these features 12, 13 are not necessary components of the instant invention. The key pad 12 has actuator buttons 5 that protrude through the top surface of the front panel 11. The housing 10 is shown as having a generally rectangular shape, but it should be understood that the housing 10 can have other shapes, i.e., square, oblong, etc. The housing 10 is preferably molded from a thermoplastic material.

Figure 8:
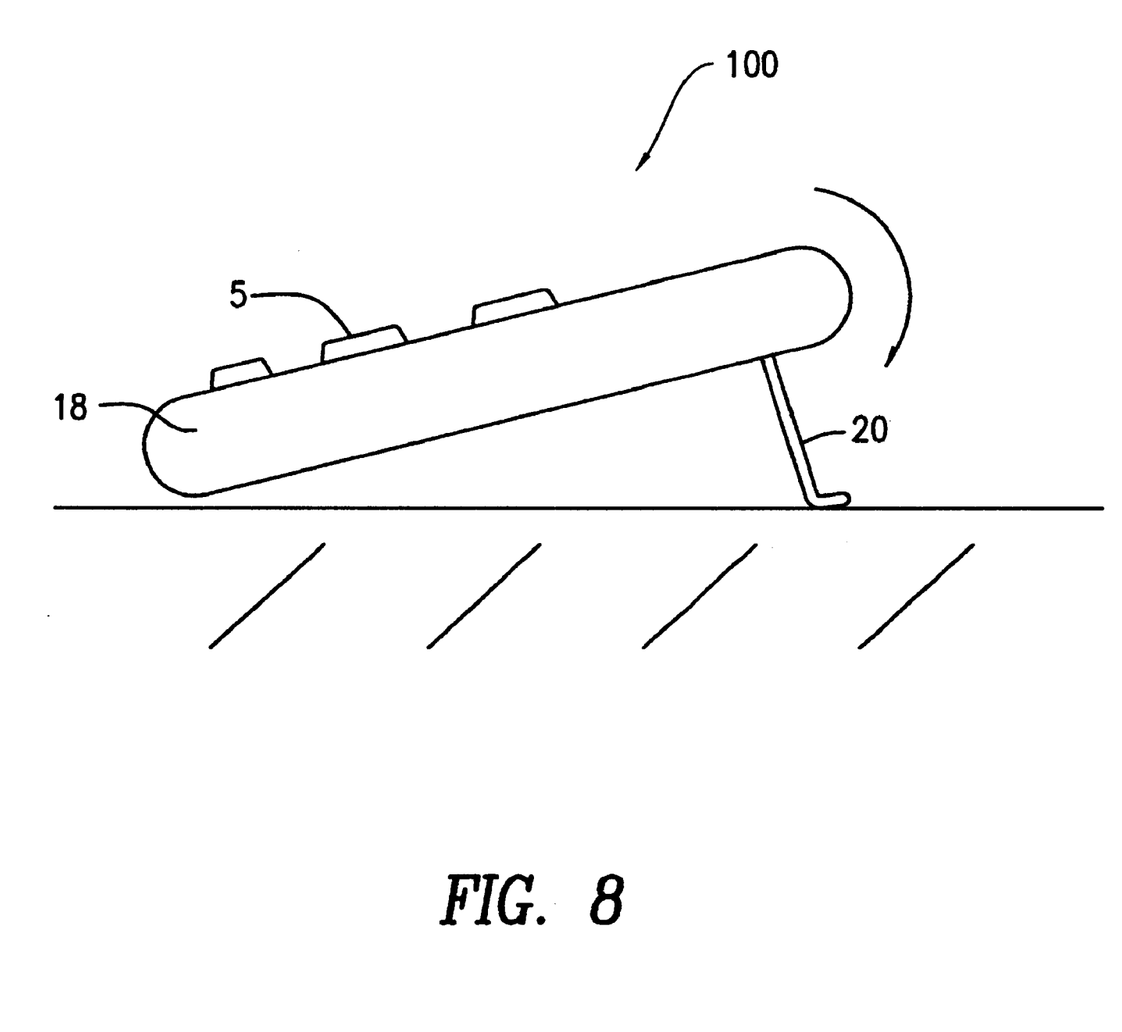
FIG. 8 is a side elevational view of the device of the present invention in the stand position.

A cover 20 is rotatably connected to the housing. The cover is sized and shaped to be closed upon the display screen 13 or on the front panel 11 when the device 100 is not in use. When released from its closed position, the cover 20 automatically rotates rearwardly to an open position. The cover is preferably rotated to form a stand for the device 100 (shown in FIG. 8), but it should be understood that the cover can rotate rearwardly to many positions at different angles relative to the front panel 11.

Figure 2:
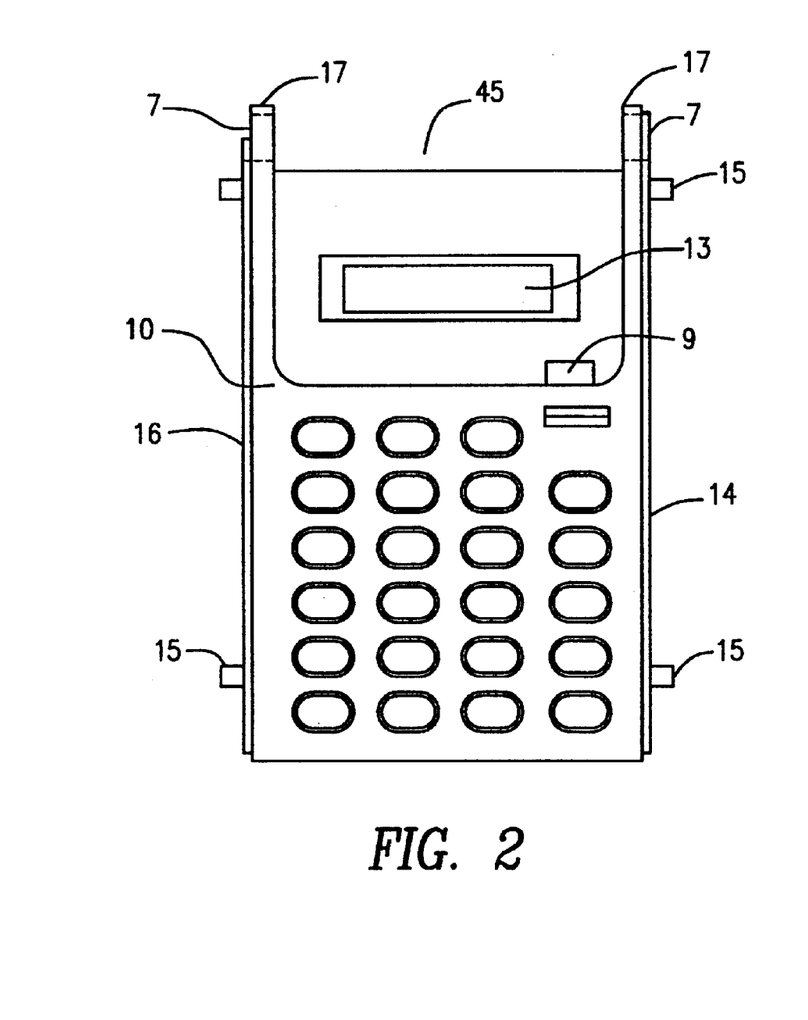
FIG. 2 is a front sectional view of the housing used in the device of the present invention.

Referring to FIG. 2, a pair of support members 17 extend from opposite ends of the housing 10, preferably from the top part of the housing. The support members 17 can also extend upward from the front panel 11 of the housing at opposite ends thereof. Bores 7 extend through each support member 17. Recess 45 is formed between the support members 17 and the top part of the housing 10.

Lugs 15 extend from the right side 14 and the left side 16 of the device housing 10.

The support members 17 and the lugs 15 can be integrally formed with the housing 10.

Figure 3:
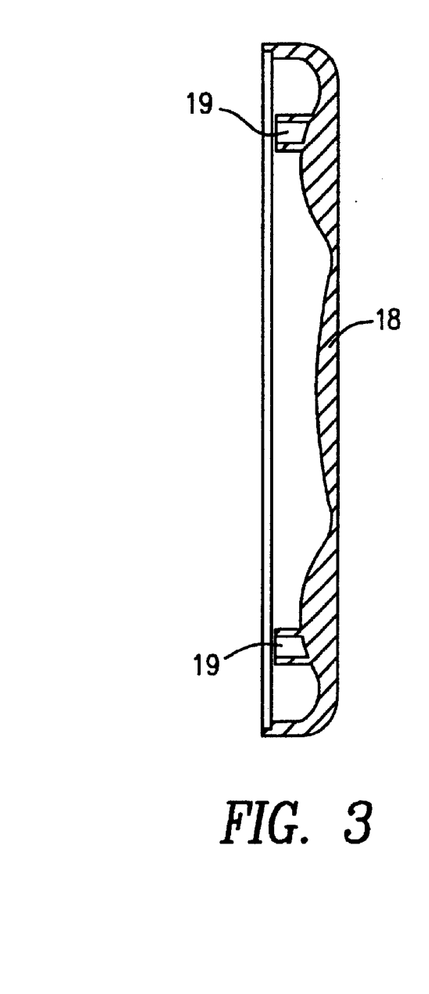
FIG. 3 is a side sectional view of the side panel used in the device of the present invention.

Referring to FIGS. 1 and 3, end caps 18 are preferably affixed to the right side 14 and left side 16 of the housing 10. The end caps 18 are preferably hollow in structure and have interior recesses 19 formed on the inside thereof. The end caps. 18 can be made from a flexible and resilient material, such as a thermoplastic. The end caps 18 can also be integrally formed with the housing 10, as is known by one of ordinary skill in the art. For example, the housing 10 can consist of two halves which are connected together to form the housing, including the end caps 18.

The lugs 15 are sized and shaped to be received inside the interior recesses 19 for connecting the end caps 18 to the sides 14, 16 of the housing 10. Other types of connection means, including, but not limited to, adhesives, snap-on connections and friction fit, can be used to connect the end caps 18 to the housing 10, as is known by one of ordinary skill in the art.

Figure 4A:
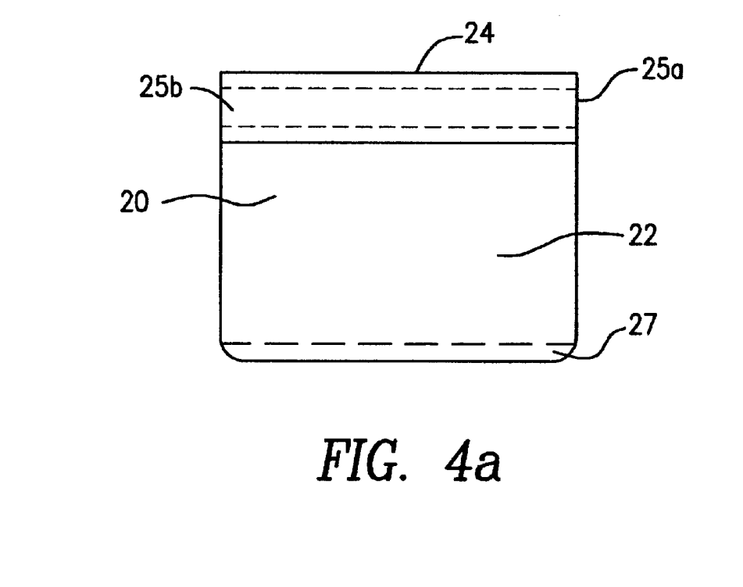
FIG. 4a is a front elevational view of the cover used in the device of the present invention.
Figure 4B:
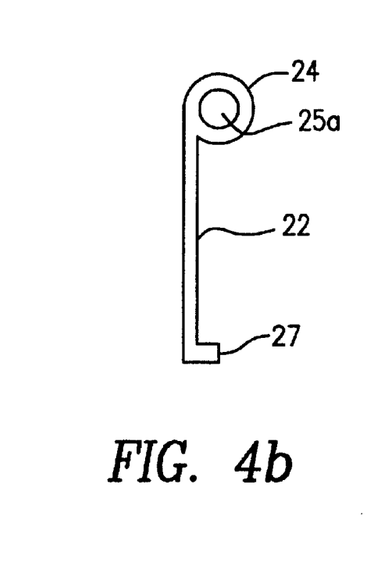
FIG. 4b is a side elevational view of the cover used in the device of the present invention.

As shown in FIGS. 4a and 4b, the cover 20 preferably includes a flat portion 22, a connecting member 24 which is connected to the top end of the panel 22, and a flange 27 which is connected to the bottom end of the panel 22.

The connecting member 24 is sized and shaped to be rotatably held between the support members 17. The connecting member is preferably tubular and has openings 25a, 25b at opposite ends thereof.

Figure 5:
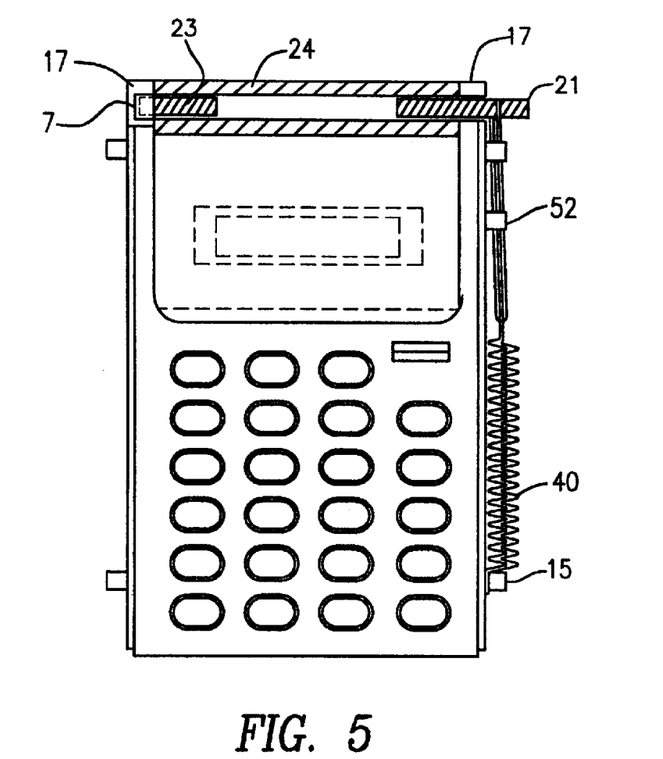
FIG. 5 is a front sectional view of the device of the present invention.
Figure 5A:
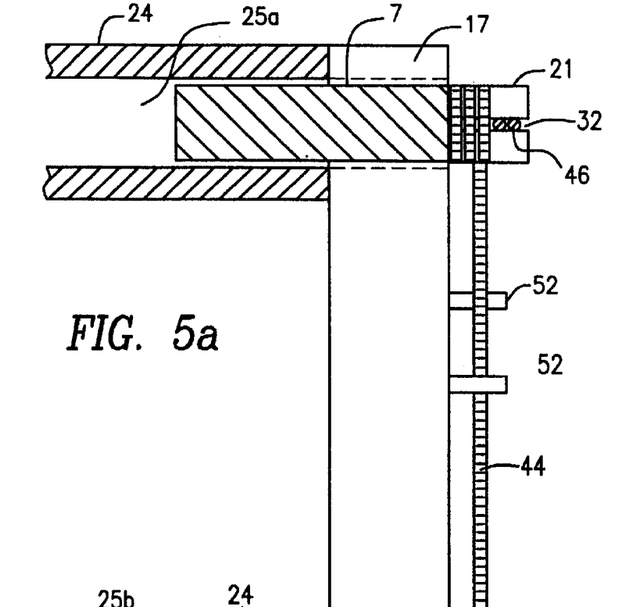
FIG. 5a is a sectional view of the shaft extension used in the device of the present invention.

A shaft 21 extends from at least one end of the cover 20, as shown in FIGS. 5 and 5a. The shaft 21 has one end which is non-rotatably secured inside the opening 25a of the connecting member 24. The shaft 21 and connecting member 24 can be non-rotatably secured together by glue, a dove-tail type connection, a screw connection, friction fit, or any other type of connection, as is known by one of ordinary skill in the art.

Figures 5B, 5C:
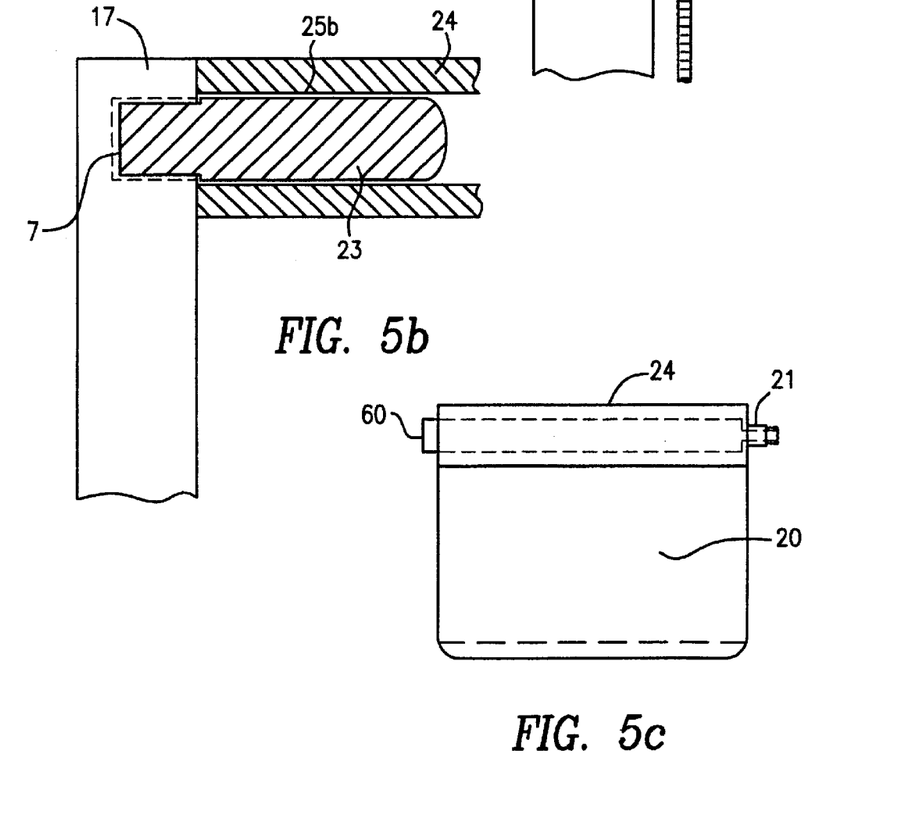
FIG. 5b is a sectional view of the journal used in the device of the present invention.
FIG. 5c is a front elevational view of a second embodiment of the cover used in the device of the present invention.

A journal 23, as shown in FIGS. 5 and 5b, has one end which is affixed to the support member 17 and a second end which is received inside the opening 25b of the connecting member 24. The journal 23 is sized and shaped to allow for rotation of the cover 20 relative to the journal 23.

In another embodiment, as shown in FIG. 5c, the shaft 21 is integrally formed with the connecting member 20. A post 60 extends from the opposite end of the connecting member 24 for pivoting the cover 20 to the support member 17. The post 60 is received in the bore 7 of the support member 17.

Referring to FIGS. 5 and 5a, the shaft 21 is sized and shaped to be received in the bore 7 of the support member 17. The shaft 21 extends the entire thickness of the support member 17 and exits the bore 7 at the outer face thereof.

An opening 32 is preferably formed on the shaft end 21 which exits the bore 7. The opening 32 can be a center axial opening or a center diagonal slot, or any other type of opening or notch, as is known by one of ordinary skill in the art.

Figure 6:
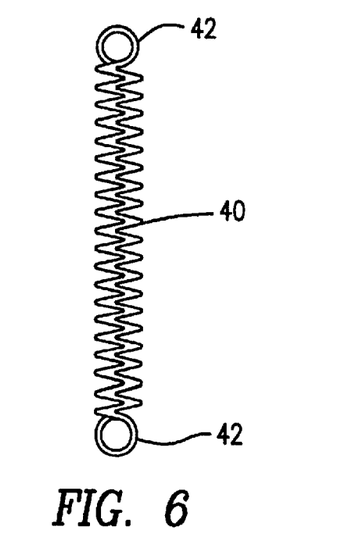
FIG. 6 is a front elevational view of the spring used in the device of the present invention.

As shown in FIGS. 5 and 6, a spring 40 is affixed to at least one side 14 of the housing 10. Preferably, the spring 40 is an extension spring and made of steel wire. A loop 42 is formed at the top end and bottom end of the spring 40. The bottom loop 42 of the spring 40 is affixed to the housing, and preferably to the lug 15. A line 44, preferably formed of nylon, as shown in FIGS. 5 and 5a, is connected to the top loop 42 of the spring 40 at one of its ends and wound onto the shaft end that exits the bore 7 of the support member 17. The line 44 can be a filament, string or wire. The end of the wound part of the line 44 is preferably inserted in the opening 32 of the shaft 21. A pin 46, as shown in FIG. 5a, is received in the opening 32 to lock the line 44 therein and to prevent the line from slipping out. The pin is preferably friction fitted inside the opening 32.

Figure 7:
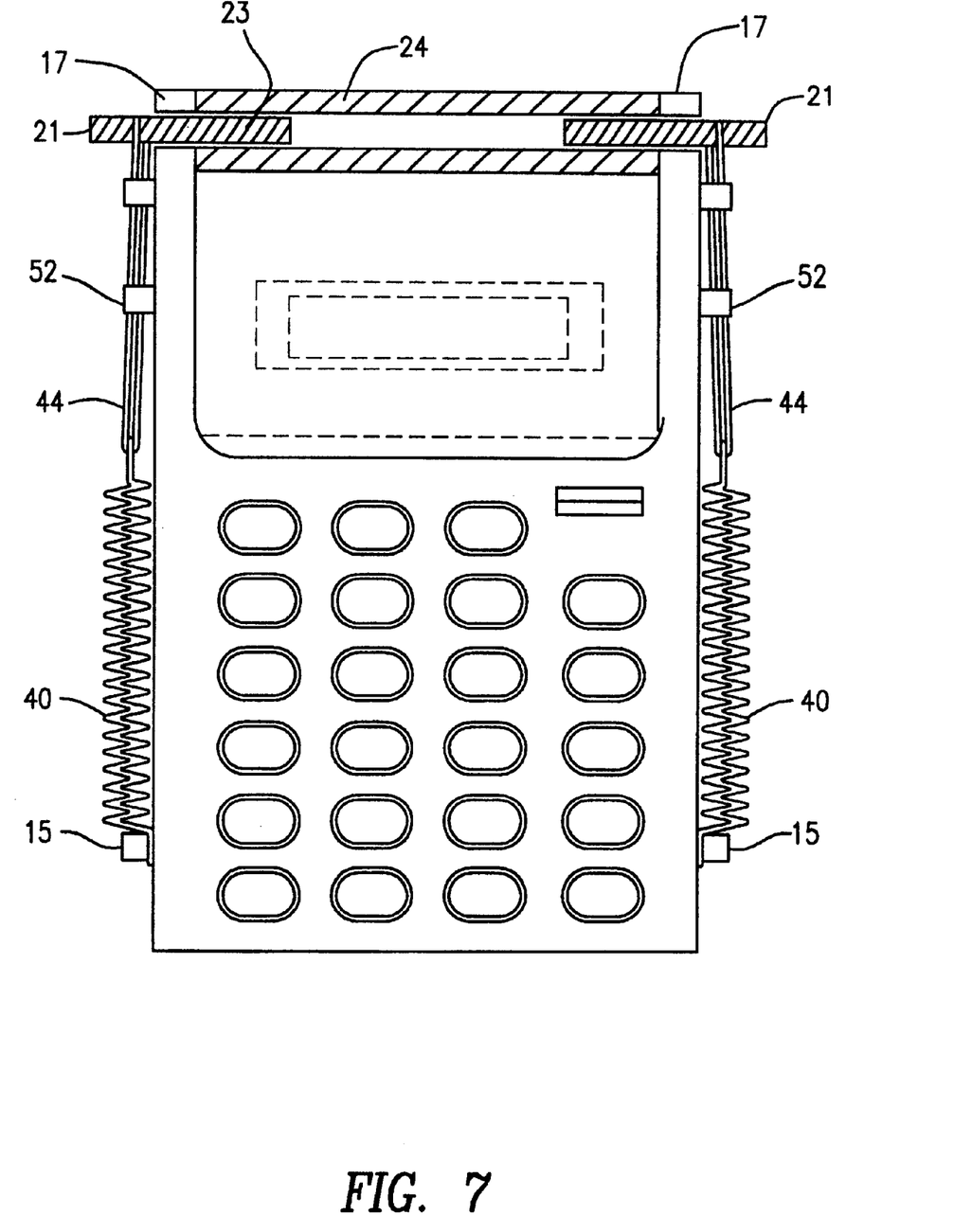
FIG. 7 is a front sectional view of the device of the present invention having a spring and line assembly formed on each side of housing.

The spring 40 and line 44 may also be formed on the opposite side 16 of the housing 10, as shown in FIG. 7, in the same manner, as described above. This is especially useful when the cover 20 is heavy and requires more than one spring for a balanced rotation.

Figure 4C:
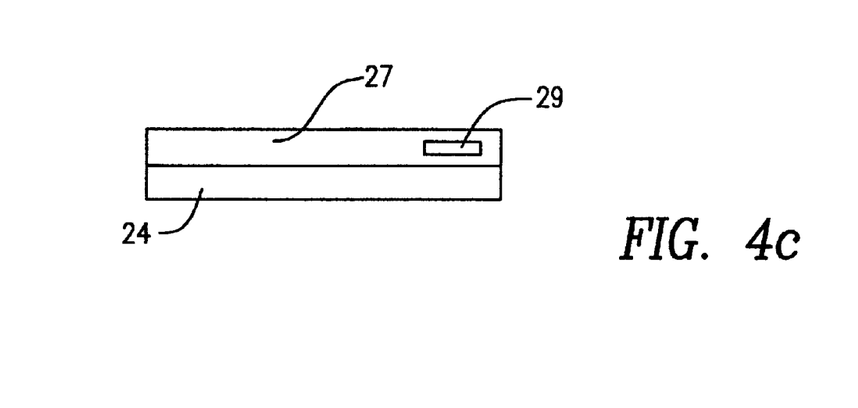
FIG. 4c is a bottom elevational view of the cover used in the device of the present invention.

Referring to FIG. 4c, a notch 29 is formed on the top face of the flange 27. The tab 8 (as shown in FIG. 1) having an integral latch 9 (as shown in FIG. 2) is slidably mounted on the front panel 11 of the housing 10. The latch 9 is biased into the notch 29 by a spring (not shown). The latch 9 is received in the notch 29 to maintain the cover 20 in the closed position.

When the cover 20 is in a closed position, the line 44 is wound onto the shaft 21. The winding of the line 44 pulls the spring 40 upward so that the spring 40 becomes longitudinally extended. Pressing the tab 8 downward releases the latch 9 from the notch 29 in the cover 20, thus disengaging the cover. The spring 40 returns toward a neutral state and pulls the line 44 downward, thereby unwinding the line from the shaft 21. Since the line is connected to the shaft 21, the unwinding of the line 44 rotates the shaft 21, which in turn, rotates the cover 20 which is connected to the shaft 21 in a rearward direction to the open position, preferably forming a stand for the device. However, it should be understood that the cover can rotate rearwardly to many positions at different angles relative to the front panel 11. The rotational distance of the cover can be controlled by the length of line 44, tensile force of the spring, a stop member adjacent the device housing which prevents further rotation of the cover, or any other means as is known by one of ordinary skill in the art.

In order to close the device, the cover 20 is manually pivoted forward until the latch 9 engages the notch 29 of the cover 20 and retains the cover 20 in its latched and closed position.

The line 44 may be interposed between and/or placed in contact with two or more surfaces to dampen or slow the speed of rearward rotation of the cover 20. Posts 52 transversely extend from the side of the housing 14, as shown in FIGS. 5 and 5A, and are sized and shaped so that the line 44 rubs against them 52 when unwinding from the shaft 21. The posts 52 are preferably positioned in a vertical, staggered relation to each other to form a path for the line 44. The posts 52 slow down and counteract any tendency for rapid pivoting movement of the cover 20 which could cause the housing 10 to bounce and possibly damage any internal components or electronics thereof. A damping grease (not shown), such as a highly viscous oil or grease, can also be placed on the line 44, the spring 40, the exterior surfaces of the shaft 21 and journal 23 and the interior surfaces of the bores 7 for dampening the rotational speed of the cover 20. Other means for dampening the rotational speed of the cover 20 are well known in the prior art.

Referring to FIG. 1, the device 100 is of a relatively simple construction.

The actuator buttons 5 may be mounted on a support or substrate comprising a panel having a printed circuit board and battery attachment for retaining a battery in position thereon (not shown). A suitable rear panel (not shown) is fastened to the housing 10 by means of suitable fasteners. The front panel 11 and the rear panel are formed to be secured together. With the exception of any electronics, and the rubber components, such as the rubber buttons 5 for operating the device 100, the components for the housing 10 and cover 20 may be formed of molded plastic material.

The above object and other objects, features, and advantages of the present invention are readily apparent from the following detailed description of the best mode for carrying out the invention when taken in connection with the accompanying drawings.

While a specific embodiment of the invention has been shown and described in detail to illustrate the application of the principles of the invention, it will be understood that the invention may be embodied otherwise without departing from such principles.

What is claimed is:

1. A hinge for rotating a cover pivotably connected to a device housing from a closed position to an open position, the hinge comprising:
   a shaft connected to the cover, wherein the shaft and cover have a common axis of rotation;
   a spring adjacent a side of the device housing, the spring having a top end and a bottom end, the bottom end being affixed to the device housing;
   a line having a first end and a second end, the first end of the line being connected to the top end of the spring, the second end of the line being wound onto the shaft, wherein when the cover is in the closed position, the spring is in an extended state, and upon release of the cover from the closed position, the spring returns toward a neutral state, thereby unwinding the line from the shaft, causing rotation of the cover to the open position.

2. The hinge as claimed in claim 1, wherein the spring has a center axis which is perpendicular to the axis of rotation of the shaft.

3. The hinge as claimed in claim 1, wherein the spring has a top loop and a bottom loop, the top loop being connected to the line and the bottom loop being connected to the device housing.

4. The hinge as claimed in claim 1, wherein the spring is an extension spring.

5. The hinge as claimed in claim 1, wherein the line is formed of nylon.

6. The hinge as claimed in claim 1, wherein upon release of the cover from the closed position, the cover rotates to a standing position.

7. A hinge for rotating a cover relative to a device housing from a closed position to an open position, the hinge comprising:
   a pair of support members connected to the device housing, the cover rotatably held between the support members;
   a shaft connected to the cover, wherein the shaft and cover have a common axis of rotation;
   a spring adjacent a side of the device housing, the spring having a top end and a bottom end, the bottom end being affixed to the device housing;
   a line having a first end and a second end, the first end of the line being connected to the top end of the spring, the second end of the line being wound onto the shaft, wherein when the cover is in the closed position, the spring is in an extended state, and upon release of the cover from the closed position, the spring returns toward a neutral state, thereby unwinding the line from the shaft, causing rotation of the cover to an open position.

8. A hinged device comprising:
   a housing having a pair of support members extending from opposite sides of the housing, at least one of the support members having a bore;
   a cover rotatably connected to the support members, the cover positioned over the housing when the cover is in a closed position;
   a shaft extending from at least one end of the cover through the bore outside the support member;
   a spring adjacent a side of the housing, the spring having a top end and a bottom end, the bottom end being affixed to the housing;
   a line having a first end and a second end, the first end of the line being connected to the top end of the spring, the second end of the line being wound onto the shaft which extends through the bore outside the support member, wherein when the cover is in the closed position, the spring is in an extended state, and upon release of the cover from the closed position, the spring returns toward a neutral state, thereby unwinding the line from the shaft, causing rotation of the cover to an open position.

9. The hinged device as claimed in claim 8, wherein upon release of the cover from the closed position, the cover rotates to a standing position.

10. The hinged device as claimed in claim 8, wherein the hinged device is one of a calculator, a clock, an alarm, a note holder, a portable telephone and a document holder.

11. The hinged device as claimed in claim 8, wherein the cover comprises a panel and a connecting member extending from an end of the panel, the shaft being connected to the connecting member.

12. The hinged device as claimed in claim 11, wherein the connecting member is tubular.

13. The hinged device as claimed in claim 11, wherein the connecting member is rotatably held between the support members.

14. The hinged device as claimed in claim 11, wherein the connecting member has a pair of openings at opposite ends thereof.

15. The hinged device as claimed in claim 14, wherein one end of the shaft is secured inside one of the openings of the cover.

16. The hinged device as claimed in claim 14, further comprising a journal having one end affixed to one of the support members and a second end received inside one of the openings of the cover, wherein the cover rotates relative to the journal.

17. The hinged device as claimed in claim 8, wherein the cover and the shaft are formed integrally.

18. The hinged device as claimed in claim 8, wherein the shaft has an opening on one of its ends.

19. The hinged device as claimed in claim 18, further comprising means for securing the second end of the line inside the opening of the shaft.

20. The hinged device as claimed in claim 19, wherein the securing means is a pin.

21. The hinged device as claimed claim 8, wherein the spring is an extension spring.

22. The hinged device as claimed in claim 8, wherein the spring has a top loop and a bottom loop, the top loop being connected to the line and the bottom loop being connected to the housing.

23. The hinged device as claimed in claim 8, wherein the housing further comprises a lug projecting from a side of the housing, the bottom end of the spring being affixed to said lug.

24. The hinged device as claimed in claim 8, wherein the line is formed of nylon.

25. The hinged device as claimed in claim 8, further comprising means for releasing the cover from the closed position to the open position.

26. The hinged device as claimed in claim 25, wherein the releasing means comprises a latch slidably mounted in the housing, the latch engaging the cover in the closed position and operable to release said cover from said closed position.

27. The hinged device as claimed in claim 8, further comprising a damping means for dampening the rotation of the cover.

* * * * *